United States Patent
Chiba

(10) Patent No.: US 10,614,511 B2
(45) Date of Patent: Apr. 7, 2020

(54) INFORMATION PROCESSING SYSTEM, METHOD FOR CONTROLLING INFORMATION PROCESSING SYSTEM, INFORMATION PROCESSING DEVICE, PROGRAM, AND INFORMATION STORAGE MEDIUM

(71) Applicant: Rakuten, Inc., Tokyo (JP)

(72) Inventor: Naoki Chiba, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 781 days.

(21) Appl. No.: 15/114,405

(22) PCT Filed: Jan. 27, 2014

(86) PCT No.: PCT/JP2014/051728
§ 371 (c)(1),
(2) Date: Jul. 27, 2016

(87) PCT Pub. No.: WO2015/111228
PCT Pub. Date: Jul. 30, 2015

(65) Prior Publication Data
US 2016/0343065 A1    Nov. 24, 2016

(51) Int. Cl.
*G06Q 30/06* (2012.01)
*G06F 40/58* (2020.01)
*G06K 9/32* (2006.01)

(52) U.S. Cl.
CPC ......... *G06Q 30/0643* (2013.01); *G06F 40/58* (2020.01); *G06K 9/325* (2013.01);
(Continued)

(58) Field of Classification Search
None
See application file for complete search history.

(56) References Cited

U.S. PATENT DOCUMENTS 5,065,161 A * 11/1991 Shibutani ............... G01S 7/066
                                                    342/176
6,185,338 B1 * 2/2001 Nakamura ........... G06K 9/2054
                                                    382/105
(Continued)

FOREIGN PATENT DOCUMENTS

JP     2008-181360 A    8/2008
JP     2012-048724 A    3/2012
(Continued)

OTHER PUBLICATIONS

Partial translation of OA dated Sep. 29, 2015 for corres. JP App. No. 2015-539973.

(Continued)

*Primary Examiner* — Fateh M Obaid
(74) *Attorney, Agent, or Firm* — HEA Law PLLC

(57) ABSTRACT

A determination unit determines, based on a character string contained in an image and a determination condition stored in a storage unit, whether or not it is appropriate to have a viewer to view the image according to a setting in which the information indicated by the character string is not changed or deleted. When the determination unit determines that it is not appropriate to have the viewer to view the image according to the setting in which the information indicated by the character string is not changed or deleted, a processing executing unit executes processing necessary for having the viewer to view the image according to a setting in which the information indicated by the character string is changed or deleted.

11 Claims, 13 Drawing Sheets

(52) U.S. Cl.
CPC ......... *G06Q 30/06* (2013.01); *G06Q 30/0601* (2013.01); *G06Q 30/0641* (2013.01); *G06K 2209/01* (2013.01)

(56) References Cited

U.S. PATENT DOCUMENTS

| | | | | |
|---|---|---|---|---|
| 6,240,206 | B1* | 5/2001 | Tokuyama | H04N 1/40062 358/452 |
| 6,317,217 | B1* | 11/2001 | Toda | G06K 15/00 358/1.1 |
| 6,468,162 | B1* | 10/2002 | Nakamura | G07F 17/32 463/23 |
| 2001/0037386 | A1* | 11/2001 | Takatsuka | A63F 13/12 709/225 |
| 2008/0016451 | A1* | 1/2008 | Funabashi | G06F 3/04815 715/757 |
| 2008/0063384 | A1* | 3/2008 | Tanaka | B41J 3/4071 386/239 |
| 2009/0049403 | A1* | 2/2009 | Jones | G06Q 30/02 715/810 |
| 2011/0125768 | A1* | 5/2011 | Shibao | G06F 16/166 707/756 |
| 2011/0141141 | A1* | 6/2011 | Kankainen | G01C 21/3647 345/632 |
| 2012/0008171 | A1* | 1/2012 | Okada | H04N 1/00883 358/3.28 |
| 2012/0053992 | A1 | 3/2012 | Erol et al. | |
| 2012/0133782 | A1* | 5/2012 | David | G06Q 30/02 348/207.1 |
| 2013/0039537 | A1* | 2/2013 | Yamazaki | G06T 11/00 382/103 |
| 2014/0247272 | A1 | 9/2014 | Sako et al. | |
| 2014/0317644 | A1* | 10/2014 | Bermudez | H04N 21/812 725/9 |
| 2016/0232181 | A1* | 8/2016 | Masuko | G06K 9/6202 |

FOREIGN PATENT DOCUMENTS

| | | |
|---|---|---|
| JP | 2013-092855 A | 5/2013 |
| JP | 2013-122747 A | 6/2013 |
| JP | 2013-142918 A | 7/2013 |

OTHER PUBLICATIONS

English Translation of International Search Report for PCT/JP2014/051728 dated Jan. 27, 2014.

* cited by examiner

FIG.6

| USER ID | USER NAME | DELIVERY DESTINATION | MAIL ADDRESS |
|---------|-----------|----------------------|--------------|
| U001    | — — —     | — — —                | — — —        |
| U002    | — — —     | — — —                | — — —        |
| ...     | ...       | ...                  | ...          |

FIG.7

| STORE ID | STORE NAME | LOCATION | MAIL ADDRESS |
|----------|------------|----------|--------------|
| S001     | — — —      | — — —    | — — —        |
| S002     | — — —      | — — —    | — — —        |
| ...      | ...        | ...      | ...          |

FIG.8

| ITEM ID | STORE | ITEM NAME | CATEGORY | PRICE | ITEM PAGE DATA | ITEM IMAGE ID | ITEM IMAGE | TRANSLATED PAGE DATA |
|---|---|---|---|---|---|---|---|---|
| G001 | S001 | --- | --- | --- | --- | I001 | --- | --- |
| G002 | S001 | --- | --- | --- | --- | I002 | --- | --- |
| ... | ... | ... | ... | ... | ... | ... | ... | ... |

FIG.9

| ITEM IMAGE ID | RECOGNIZED CHARACTER STRING | POSITION | TRANSLATED CHARACTER STRING | RELATED SPECIAL PRIVILEGE |
|---|---|---|---|---|
| I001 | 送料無料 | ——— | Free Shippinng | A001 |
| ... | ... | ... | ... | ... |

FIG.10

| SPECIAL PRIVILEGE ID | CONTENT | CHARACTER STRING EXAMPLE |
|---|---|---|
| A001 | SHIPPING FEE OF ITEM BECOMES FREE | 送料無料(FREE SHIPPING),—— |
| A002 | POINTS ARE DOUBLE | ポイント2倍(DOUBLE POINTS),—— |
| ... | ... | ... |

FIG.11

| SPECIAL PRIVILEGE ID | APPLICATION CONDITION ||
|---|---|---|
| | DELIVERY DESTINATION | TARGET PERIOD |
| A001 | IN JAPAN OTHER THAN SPECIFIC AREAS | ALWAYS |
| | SPECIFIC AREAS IN JAPAN | 2014/1/1～2/28 |
| | OUTSIDE JAPAN | 2014/2/1～2/28 |
| ... | ... | ... |

INFORMATION PROCESSING SYSTEM, METHOD FOR CONTROLLING INFORMATION PROCESSING SYSTEM, INFORMATION PROCESSING DEVICE, PROGRAM, AND INFORMATION STORAGE MEDIUM

CROSS REFERENCE TO RELATED APPLICATIONS

This application is a National Stage of International Application No. PCT/JP2014/051728 filed on Jan. 27, 2014. The contents of the above document is incorporated herein by reference in its entirety.

TECHNICAL FIELD

The present invention relates to an information processing system, a method for controlling an information processing system, an information processing device, a program, and an information storage medium.

BACKGROUND ART

There has been known an information processing system for outputting an image containing a character string to a display unit. For example, in an electronic commerce system that implements a virtual shopping mall where a plurality of stores are open, an item image prepared by a store is displayed on a display unit of a user terminal. In such an electronic commerce system, there may be a case in which a character string indicating a special privilege, such as "free shipping" etc., for example, is added to an item image (see FIG. 13 in Patent Literature 1, for example).

CITATION LIST

Patent Literature

Patent Literature 1: JP 2013-142918 A

SUMMARY OF INVENTION

Technical Problem

In the above described information processing system, inconvenience may be caused if the information indicated by a character string contained in an image is conveyed as it is to a viewer of the image. For example, in the above described electronic commerce system, the special privilege of "free shipping" may not be applied to a user who has registered a location outside Japan as a delivery destination of an item. However, there is a case in which an item image is prepared without taking into account of such a user, based only on an assumption that an item is delivered to a domestic location in Japan, and an item image containing a character string "free shipping" is displayed at a user terminal used by such a user. In this case, there is a possibility that the user misunderstands that the shipping fee is free although the shipping fee is actually not free.

The present invention has been conceived in view of the above, and aims to provide an information processing system, a method for controlling an information processing system, an information processing device, a program, and an information storage medium capable of preventing occurrence of such an inconvenience that is resulted as the information indicated by a character string contained in an image is conveyed as it is to a viewer of the image.

Solution to Problem

In order to achieve the above described object, an information processing system according to the present invention includes determination means for determining, based on a character string contained in an image and a determination condition stored in storage means, whether or not it is appropriate to have a viewer to view the image according to a setting in which information indicated by the character string is not changed or deleted; and processing execution means for executing processing necessary for having the viewer to view the image according to a setting in which the information indicated by the character string is changed or deleted in a case where the determination means determines that it is not appropriate to have the viewer to view the image according to the setting in which the information indicated by the character string is not changed or deleted.

A method for controlling an information processing system according to the present invention includes a determination step of determining, based on a character string contained in an image and a determination condition stored in storage means, whether or not it is appropriate to have a viewer to view the image according to a setting in which information indicated by the character string is not changed or deleted; and a processing execution step of executing processing necessary for having the viewer to view the image according to a setting in which the information indicated by the character string is changed or deleted in a case where it is determined that it is not appropriate to have the viewer to view the image according to the setting in which the information indicated by the character string is not changed or deleted.

An information processing device according to the present invention includes determination means for determining, based on a character string contained in an image and a determination condition stored in storage means, whether or not it is appropriate to have a viewer to view the image according to a setting in which information indicated by the character string is not changed or deleted; and processing execution means for executing processing necessary for having the viewer to view the image according to a setting in which the information indicated by the character string is changed or deleted in a case where the determination means determines that it is not appropriate to have the viewer to view the image according to the setting in which the information indicated by the character string is not changed or deleted.

A program according to the present invention causes a computer to function as determination means for determining, based on a character string contained in an image and a determination condition stored in storage means, whether or not it is appropriate to have a viewer to view the image according to a setting in which information indicated by the character string is not changed or deleted; and processing execution means for executing processing necessary for having the viewer to view the image according to a setting in which the information indicated by the character string is changed or deleted in a case where the determination means determines that it is not appropriate to have the viewer to view the image according to the setting in which the information indicated by the character string is not changed or deleted.

A computer readable information storage medium according to the present invention stores a program for causing a computer to function as determination means for determining, based on a character string contained in an image and a determination condition stored in storage means, whether or not it is appropriate to have a viewer to view the image according to a setting in which information indicated by the character string is not changed or deleted; and processing execution means for executing processing necessary for having the viewer to view the image according to a setting in which the information indicated by the character string is changed or deleted in a case where the determination means determines that it is not appropriate to have the viewer to view the image according to the setting in which the information indicated by the character string is not changed or deleted.

In one aspect of the present invention, the image may be an image relevant to an item or a service, and in a case where a character string related to a special privilege to be offered to a user who receives provision of the item or the service or a burden to be imposed on the user is contained in the image, the determination means may determine whether or not the special privilege or the burden is applicable to the viewer, to thereby determine whether or not it is appropriate to have the viewer to view the image according to the setting in which the information indicated by the character string is not changed or deleted.

In one aspect of the present invention, the determination condition may include a condition related to place information in connection with the viewer, and the determination means may include means for determining, based on a result of determination as to whether or not the place information in connection with the viewer satisfies the determination condition, whether or not it is appropriate to have the viewer to view the image according to the setting in which the information indicated by the character string is not changed or deleted.

In one aspect of the present invention, the determination condition may include a condition related to a date and time at which the viewer views the image, and the determination means may include means for determining, based on a result of determination as to whether or not the date and time at which the viewer views the image satisfies the determination condition, whether or not it is appropriate to have the viewer to view the image according to the setting in which the information indicated by the character string is not changed or deleted.

In one aspect of the present invention, the determination condition may include a condition related to information associated with the image, and the determination means may include means for determining, based on a result of determination as to whether or not the information associated with the image satisfies the determination condition, whether or not it is appropriate to have the viewer to view the image according to the setting in which the information indicated by the character string is not changed or deleted.

In one aspect of the present invention, the processing necessary for having the viewer to view the image according to the setting in which the information indicated by the character string is changed or deleted may include control processing for outputting the image to display means of a terminal of the viewer according to the setting in which the information indicated by the character string is changed or deleted, and the processing execution means may include image output control means for executing control to output the image to the display means according to the setting in which the information indicated by the character string is changed or deleted, in a case where the determination means determines that it is not appropriate to have the viewer to view the image according to the setting in which the information indicated by the character string is not changed or deleted.

In one aspect of the present invention, the image output control means may include means for executing control to output to the display means a translated character string obtained by translating the character string into another language, together with or instead of the character string, and means for executing control to output a character string or an image for changing the information indicated by the character string, so as to be associated with at least one of the image, the character string, and the translated character string, in the case where the determination means determines that it is not appropriate to have the viewer to view the image according to the setting in which the information indicated by the character string is not changed or deleted.

In one aspect of the present invention, the image output control means may include means for executing control to output to the display means a translated character string obtained by translating the character string into another language, together with or instead of the character string, and means for executing control to restrict output of the translated character string to the display means, in a case where the determination means determines that it is not appropriate to have the viewer to view the image according to the setting in which the information indicated by the character string is not changed or deleted.

In one aspect of the present invention, the image output control means may include means for executing control to output a character string or an image for changing the information indicated by the character string so as to be associated with at least one of the image and the character string, in the case where the determination means determines that it is not appropriate to have the viewer to view the image according to the setting in which the information indicated by the character string is not changed or deleted.

In one aspect of the present invention, the image output control means may include means for executing control to restrict output of the character string to the display means in the case where the determination means determines that it is not appropriate to have the viewer to view the image according to the setting in which the information indicated by the character string is not changed or deleted.

In one aspect of the present invention, the processing necessary for having the viewer to view the image according to the setting in which the information indicated by the character string is changed or deleted may include processing necessary for notifying a provider of the image of information on a result of determination by the determination means.

Advantageous Effects of Invention

According to the present invention, it is possible to prevent occurrence of inconvenience that is resulted as the information indicated by a character string contained in an image is conveyed as it is to a viewer of the image.

BRIEF DESCRIPTION OF DRAWINGS

FIG. 6 shows one example of a user table;
FIG. 7 shows one example of a store table;
FIG. 8 shows one example of an item table;
FIG. 9 shows one example of a recognized character string table;
FIG. 10 shows one example of a special privilege table;
FIG. 11 shows one example of an application condition table.

DESCRIPTION OF EMBODIMENTS

In the following, examples of embodiments of the present invention will be described in detail based on the drawings. In the following, an example of a case in which the present invention is applied to an electronic commerce system that implements a virtual shopping mall where a plurality of stores are open will be described. That is, an example of a case in which an information processing system according to an embodiment of the present invention is implemented in an electronic commerce system will be described.

First Embodiment

Figure 1:
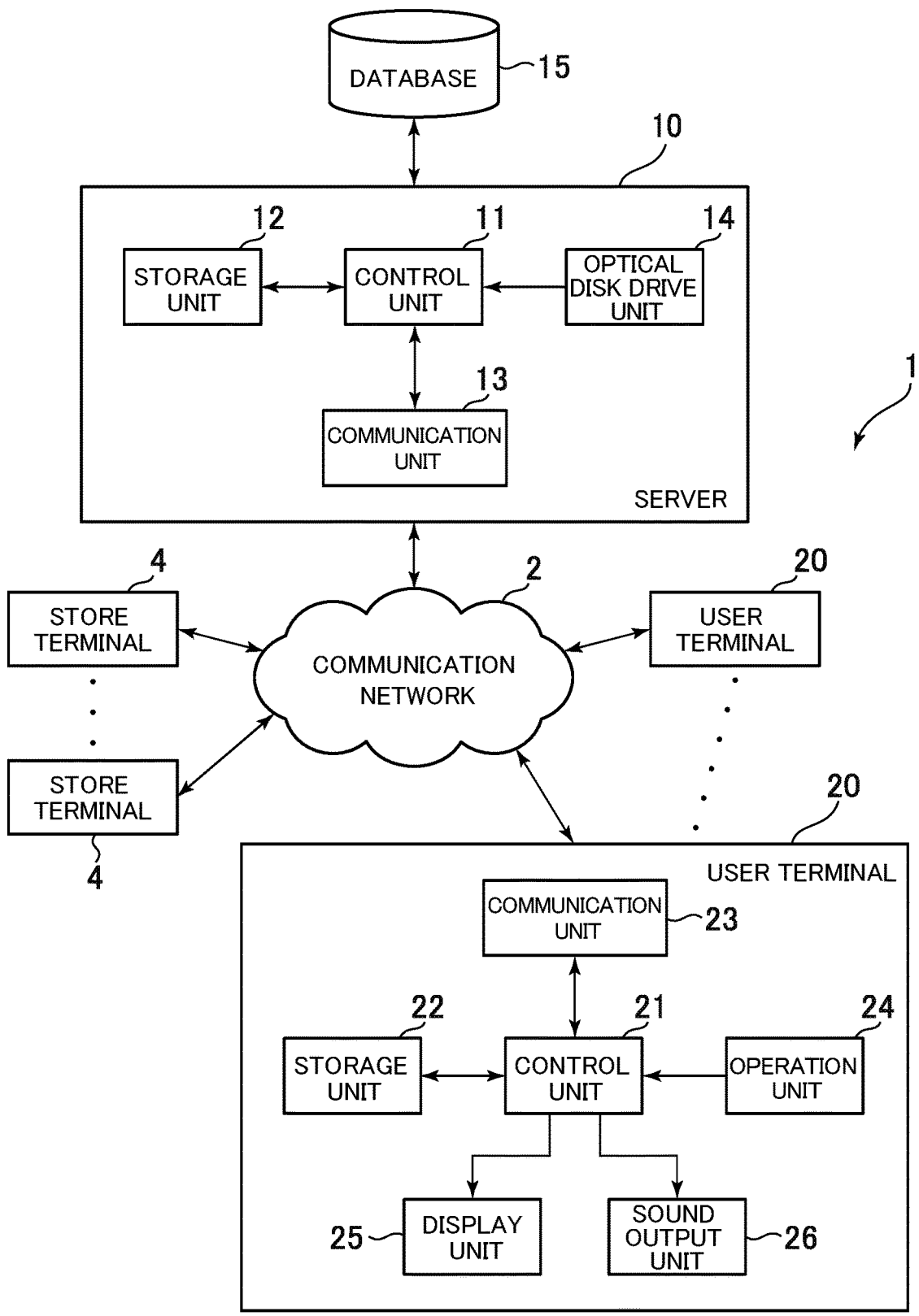
FIG. 1 shows one example of an overall structure of an electronic commerce system (an information processing system) according to an embodiment of the present invention.

A first embodiment of the present invention will be described. FIG. 1 shows one example of an overall structure of an electronic commerce system 1 (an information processing system) according to the first embodiment. As shown in FIG. 1, the electronic commerce system 1 includes a server 10, a database 15, a user terminal 20, and a store terminal 4. The server 10, the user terminal 20, and the store terminal 4 are connected to a communication network 2 including the Internet, etc., for example. Data communication is possible between the server 10 and the user terminal 20, and also between the server 10 and the store terminal 4.

The server 10 is a server (an information processing device) that functions as a portal of a virtual shopping mall. As shown in FIG. 1, the server 10 includes a control unit 11, a storage unit 12, a communication unit 13, and an optical disk drive unit 14. The control unit 11 includes one or more microprocessors, and executes information processing according to a program stored in a storage unit (memory) 12. The storage unit 12 includes a main memory unit (for example, a RAM etc.) and an auxiliary storage unit (for example, a ROM, a hard disk drive, or a solid state drive etc.). The communication unit 13 is used for data communication via the communication network 2.

The optical disk drive unit 14 is used to read a program or data recorded on an optical disk (an information storage medium). A program and data is supplied to the storage unit 12 via an optical disk (an information storage medium). That is, a program and data recorded on an optical disk is read by the optical disk drive unit 14 and stored in the storage unit 12.

The server 10 may have a structural component (for example, a memory card slot) for reading a program or data stored in an information storage medium (for example, a memory card) other than an optical disk, and a program and data may be supplied to the storage unit 12 via an information storage medium other than an optical disk. Also, a program and data may be supplied to the storage unit 12 via the communication network 2.

The server 10 can access the database 15. For example, data on a user who uses the virtual shopping mall, data on a store open in the virtual shopping mall, data on an item sold in the virtual shopping mall, etc. are stored in the database 15. Note that the database 15 may be created in a server different from the server 10 or in the server 10.

The user terminal 20 is an information processing device for use by a user. For example, the user terminal 20 includes a lap-top computer, a desk-top computer, a tablet computer, and a portable phone (including a smart phone) etc.

As shown in FIG. 1, the user terminal 20 includes a control unit 21, a storage unit 22, a communication unit 23, an operation unit 24, a display unit 25, and a sound output unit 26. The control unit 21, the storage unit 22, and the communication unit 23 are similar to the control unit 11, storage unit 12, and communication unit 13 of the server 10.

A program and data is supplied to the storage unit 22 via the communication network 2. Note that the user terminal 20 may include a structural component (for example, an optical disk drive unit or a memory card slot, etc.) for reading a program or data recorded in an information storage medium (for example, an optical disk or a memory card, etc.), and a program and data may be supplied to the storage unit 22 via the information storage medium (for example, a memory card).

The operation unit 24 is used by a user for operation. For example, in the case of a user terminal 20 having a pointing device for designating a position within a screen image displayed on the display unit 25, the pointing device corresponds to the operation unit 24. That is, for example, a mouse, a stick, a touch pad, or a touch panel formed overlapping the display unit 25 etc. corresponds to the operation unit 24.

The display unit 25 is, for example, a liquid crystal display or an organic EL display, etc., and displays various screen images. The sound output unit 26 is, for example, a speaker or a headphone, etc., and outputs various sounds.

The store terminal 4 is an information processing device equipped to a store open in the virtual shopping mall, and used to register data etc. on an item sold in the virtual shopping mall in the database 15 via the server 10. For example, the store terminal 4 is a lap-top computer, a desk-top computer, or a tablet computer, etc. The store terminal 4 has a hardware structure similar to that of the user terminal 20.

For example, in the server 10, a daemon program (for example, HTTP daemon) is executed. Also, in the user terminal 20, a program (for example, a web browser) is activated, and a processing request (for example, an HTTP request) is sent from the user terminal 20 to the server 10.

In this case, a processing result (for example, an HTTP response) corresponding to the above described processing request is sent from the server 10 to the user terminal 20. For example, data written in a page descriptive language is sent to the user terminal 20. Then, based on the data, a screen image based on the processing result is displayed on the display unit 25 of the user terminal 20. Note that similar processing is executed between the store terminal 4 and the server 10.

In using the virtual shopping mall, a user accesses the server 10, using the user terminal 20. Then, the user designates a search condition to search for an item to look for its desired item. When the user designates its desired item, an item screen (an item page) describing the information of the item is displayed on the display unit 25 of the user terminal 20.

Figure 2:
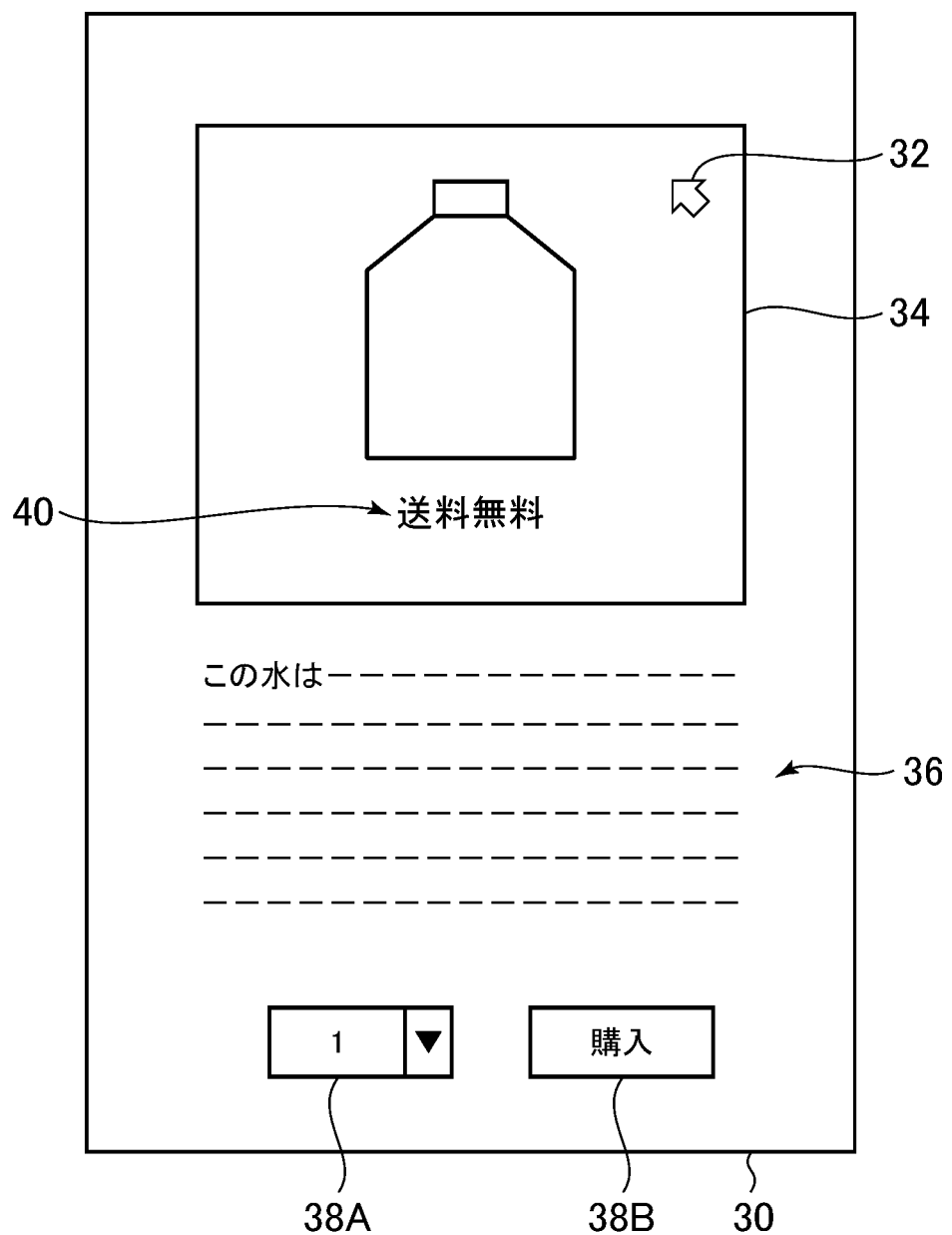
FIG. 2 shows one example of an item screen.

FIG. 2 shows one example of an item screen. As shown in FIG. 2, a cursor 32, an item image 34, a description 36, a select box 38A, and a purchase button 38B are displayed on the item screen 30. According to an operation by a user, the cursor 32 moves on the item screen 30.

The item image 34 is an image relevant to an item. The item image 34 is prepared by a store that sells the item. The item image 34 shown in FIG. 2 contains a character string 40. The character string 40 is added by the store. For example, a character string 40 that describes a special privilege which a user buying an item can receive is added. In the example shown in FIG. 2, a character string 40 written in Japanese indicating that the shipping fee of the item is free is added to the item image 34.

Note that an example of the character string 40 added to the item image 34 is not limited to the example shown in FIG. 2. For example, a character string 40 in Japanese indicating that double points compared to that at a normal time are given to a user having bought an item may be added to the item image 34.

For example, by adding the character string 40 to a captured image of an item, a store prepares the item image 34 such as is shown in FIG. 2, and registers the item image 34 in the database 15.

The description 36 is a description on the item prepared by the store, and is a description on an item written in Japanese. By referring to the description 36, a user can know details of the item. A user selects the quantity of the item in the select box 38A and then clicks the purchase button 38B to thereby execute processing for buying the item.

In the above described electronic commerce system 1, service for delivering an item sold in a store in Japan to a person living outside Japan is offered. That is, a person living outside Japan can use the virtual shopping mall. As it is highly likely that a user living outside Japan is not familiar with Japanese, the user can set a language other than Japanese as a language to use. When a user changes the language to use to any language other than Japanese, the item screen 30 is displayed in the language other than Japanese. In the following, a case in which a user can select English as a language to use will be described. Naturally, it may be arranged such that a user can select any language other than Japanese and English as a language to use.

Figure 3:
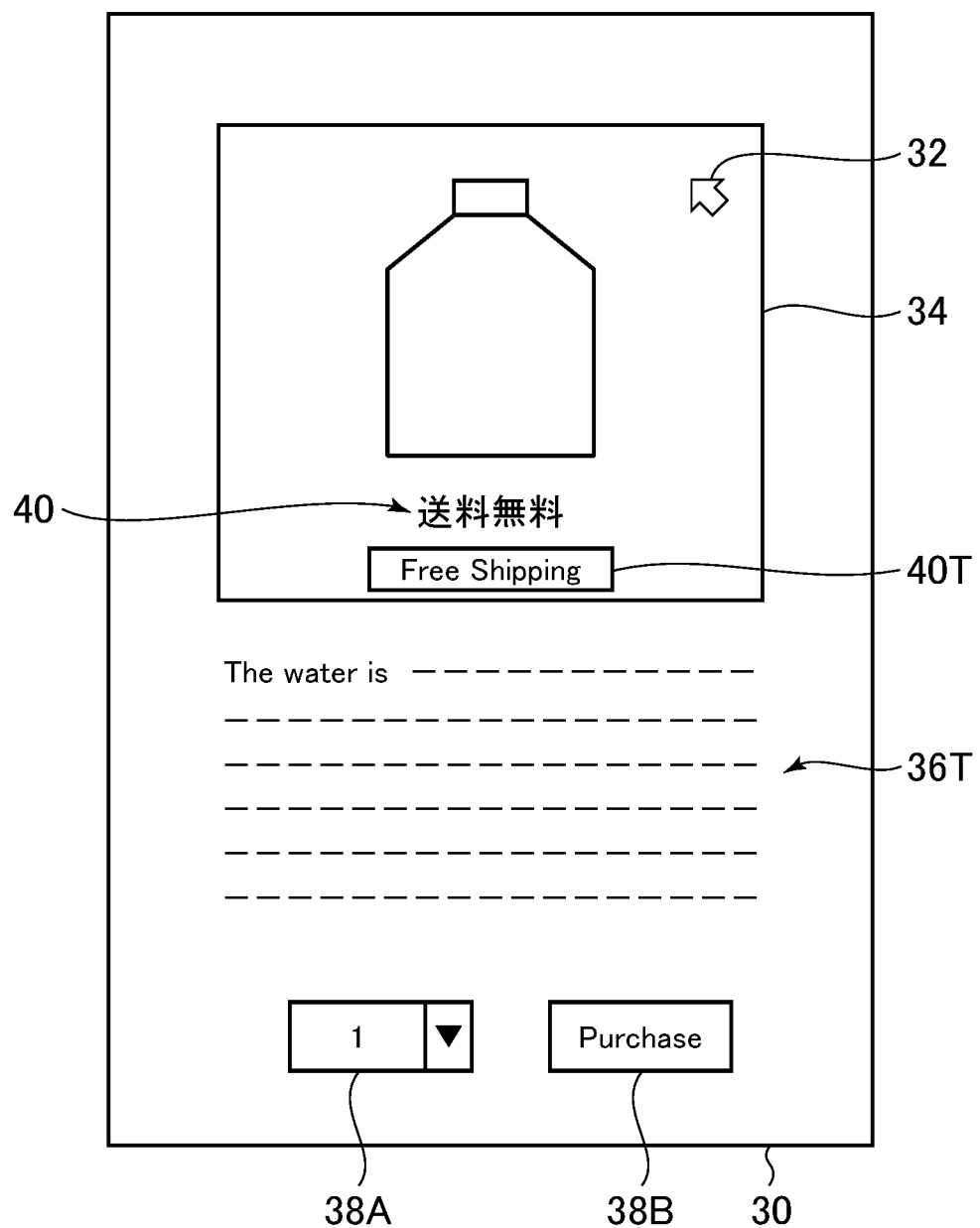
FIG. 3 shows another example of an item screen.

FIG. 3 shows one example of the item screen 30 with the language to use changed to English. On the item screen 30 shown in FIG. 3, the caption of the purchase button 30B is written in English.

Also, a translated description 36T, or a description on an item written in English, is displayed on the item screen 30 shown in FIG. 3. The translated description 36T is a description obtained by translating the Japanese description 36 prepared by a store into English. For example, the translated description 36T is prepared by applying machine translation to the Japanese description 36 prepared by a store. Note that the translated description 36T may be prepared by a store.

Further, a translated character string 40T obtained by translating the character string 40 contained in the item image 34 is displayed on the item screen 30 shown in FIG. 3. The character string 40 contained in the item image 34 is added by a store, and is a useful advertising statement for the store. Therefore, in the electronic commerce system 1, the character string 40 contained in the item image 34 as well as the description 36 is translated and displayed.

For example, the translated character string 40I is displayed when the cursor 32 is positioned on the item image 34 (that is, when a user is pointing out the item image 34). Also, the translated character string 40T is displayed so as to be associated with the original character string 40. For example, the display position of the translated character string 40T is set based on the display position of the character string 40. For example, the display position of the translated character string 40T is set such that the translated character string 40T has a predetermined positional relationship with respect to the character string 40, and the translated character string 40T is displayed in the vicinity of the character string 40. Note that a line or an image that indicates association between the translated character string 40T and the character string 40 may be displayed.

Note that the translated character string 40I may be displayed when the cursor 32 is positioned on the character string 40.

Alternatively, preview (for example, the number of characters in the translated character string 40T) of the translated character string 40T may be displayed when the cursor 32 is positioned on the item image 34, and the translated character string 40T may be displayed when the cursor 32 is positioned on the preview of the translated character string 40T.

Still alternatively, a sign may be displayed in the vicinity of the character string 40 when the cursor 32 is positioned on the item image 34, and the translated character string 40T may be displayed when the cursor 32 is positioned on the sign.

Note that instead of displaying the translated character string 40T together with the character string 40, the character string 40 may be replaced by the translated character string 40T. That is, the translated character string 40T may be displayed instead of the character string 40.

Note that the special privilege offered in purchase of an item is not applied to all users. For example, a special privilege of "free shipping" may not be applied to a user who has registered a specific region (for example, an isolated island etc.) in Japan as a delivery destination of an item (in other words, a user living in a specific region in Japan) and a user who has registered a location outside Japan as a delivery destination of an item (in other words, a user living outside Japan). For example, the special privilege of "free shipping" is applied to such a user only during a predetermined campaign period, but not at any time other than the campaign period.

However, there may be a case in which the item image 34, such as is shown in FIG. 2, for example, is prepared without taking into consideration of the presence of the above described user. For example, if the item screen 30 such as is shown in FIG. 2 or 3 (the character string 40 or the translated character string 40T) is displayed at a user terminal 20 of the above described user at any time other than a campaign period, the user may possibly misunderstand that the shipping fee is free although the shipping fee is actually not free.

Regarding this point, in the electronic commerce system 1, whether or not the special privilege indicated by the character string 40 contained in the item image 34 is applicable to a user viewing the item image 34 is determined. Then, in a case where the special privilege indicated by the character string 40 contained in the item image 34 is not applicable to a user viewing the item image 34, that effect is informed to the user. An example of the item screen 30 displayed in this case is shown in FIGS. 4 and 5.

Figure 4:
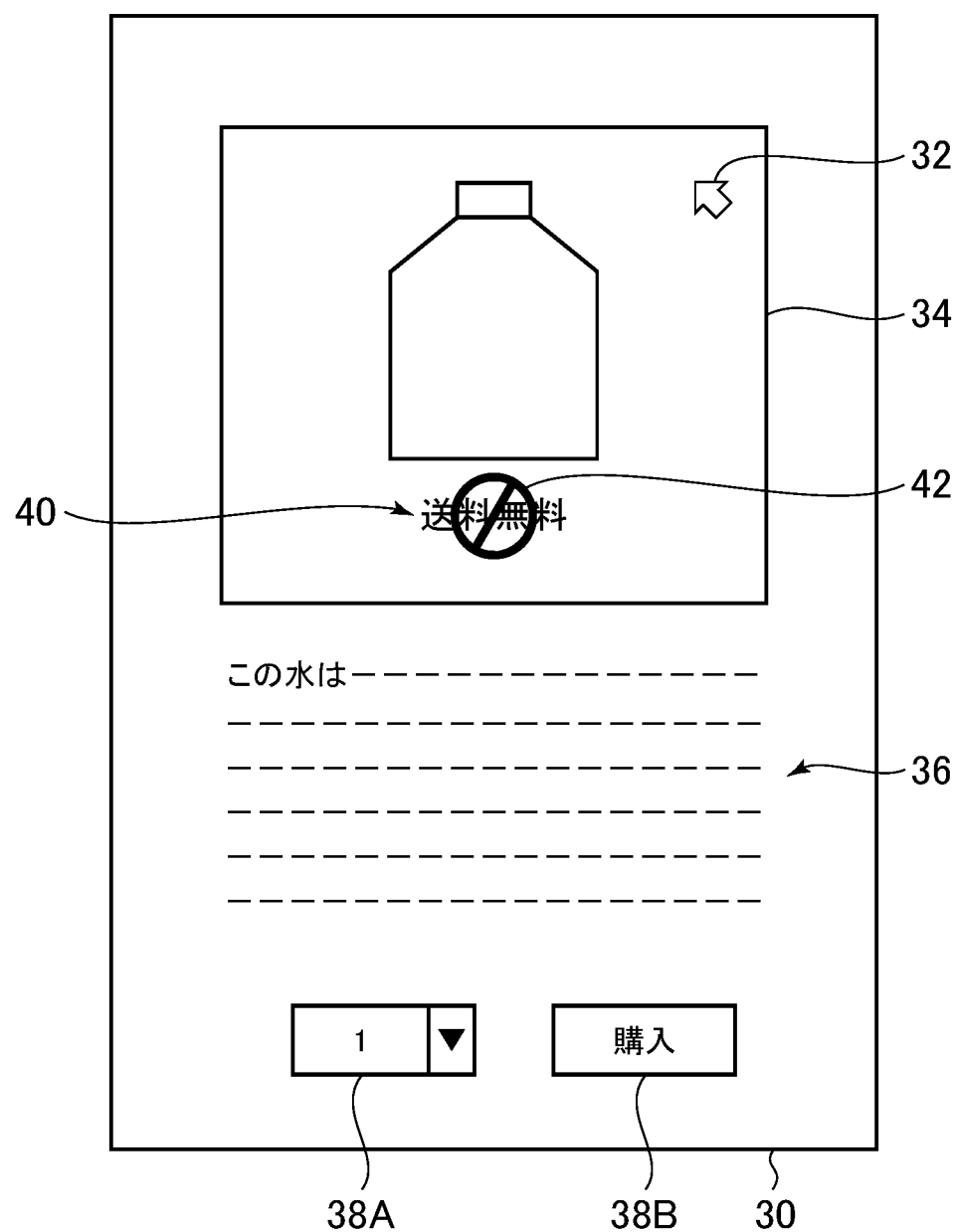
FIG. 4 shows another example of an item screen.

The item screen 30 shown in FIG. 4 is one example of the item screen 30 that is displayed at the user terminal 20 when a user who has registered a specific region in Japan or a location outside Japan as a delivery destination of an item uses the virtual shopping mall with Japanese selected as a language to use at any time other than a campaign period. On the item screen 30 shown in FIG. 4, an inapplicable mark 42 indicating that the special privilege of "free shipping" is not applied is displayed so as to be associated with the character string 40. Specifically, the inapplicable mark 42 is displayed overlapping the character string 40. By displaying the inapplicable mark 42, it is possible to inform a user that the special privilege of "free shipping" is not applied.

Figure 5:
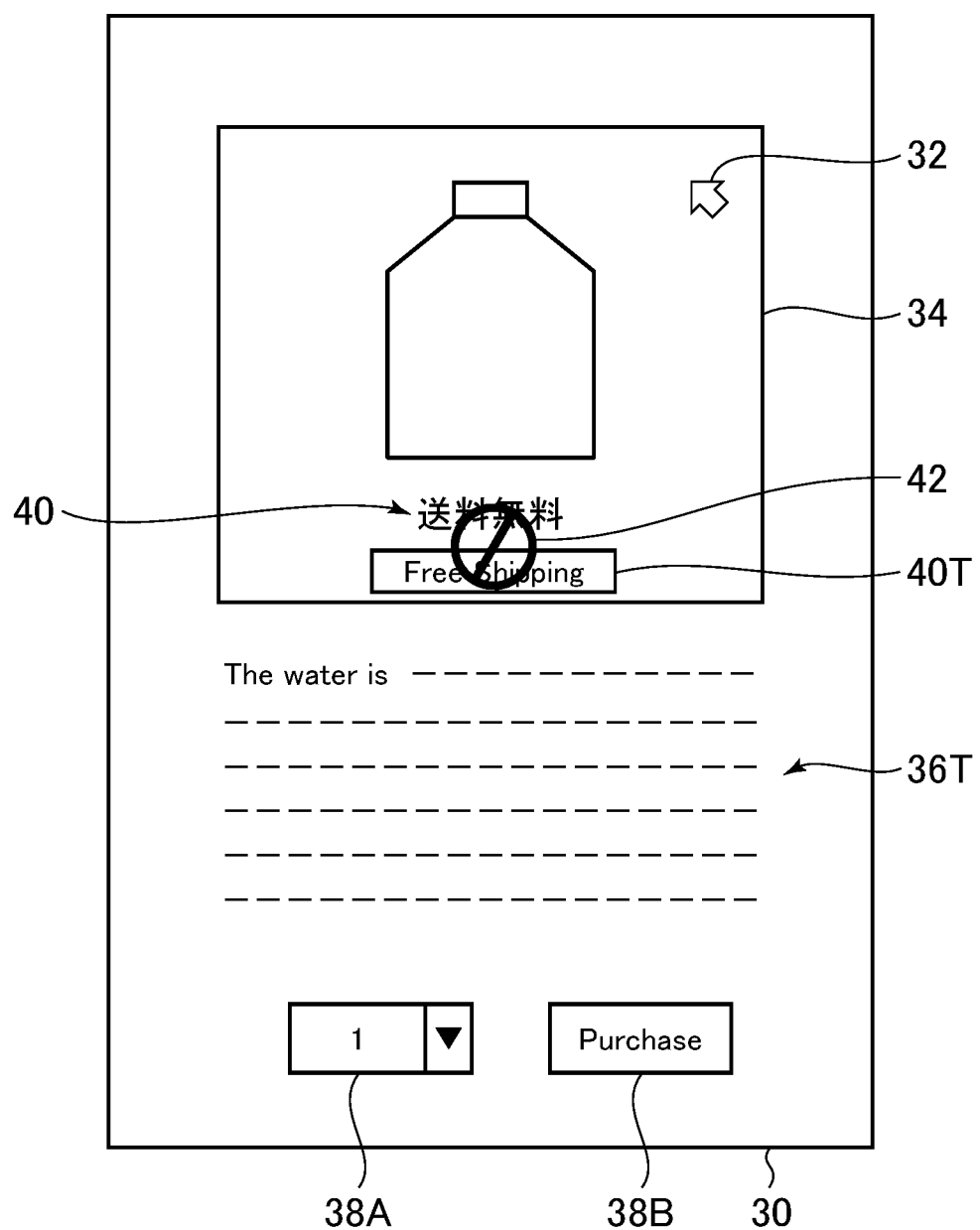
FIG. 5 shows another example of an item screen.

The item screen 30 shown in FIG. 5 is one example of the item screen 30 that is displayed at the user terminal 20 when a user who has registered a location outside Japan as a delivery destination of an item uses the virtual shopping mall with English selected as a language to use at any time other than a campaign period. On the item screen 30 shown in FIG. 5, the inapplicable mark 42 indicating that the special privilege of "free shipping" is not applied is displayed so as to be associated with the translated character string 40T (and the character string 40). Specifically, the inapplicable mark 42 is displayed overlapping the translated character string 40T (and the character string 40). By displaying the inapplicable mark 42, it is possible to inform a user that the special privilege of "free shipping" is not applied.

Note that a character string (message) indicating that special privilege is not applied may be displayed instead of displaying the inapplicable mark 42. For example, a balloon that contains a message to the effect that the special privilege is not applied, for example, may be displayed so as to be associated with the character string 40 (or the translated character string 40T) or the item image 34. Specifically, the balloon may be displayed such that at least a part thereof overlaps the character string 40 (or the translated character string 40T) or the item image 34. Alternatively, the balloon may be displayed such that the tail thereof is directed to the character string 40 (or the translated character string 40T) or the item image 34. With the above as well, it is possible to inform a user that the special privilege of "free shipping" is not applied.

Also, on the item screen 30 shown in FIG. 4, output of the character string 40 may be restricted (restrained), instead of displaying the inapplicable mark 42. For example, the character string 40 may not be displayed. Also, for example, the entirety or a part of the character string 40 may be filled with the background color of the item image 34 or blurred. With the above described as well, it is possible to inform a user that the special privilege of "free shipping" is not applied.

Similarly, on the item screen 30 shown in FIG. 5, output of the translated character string 40T may be restricted (restrained), instead of displaying the inapplicable mark 42. For example, the translated character string 40T may not be displayed or the entirety or a part of the translated character string 40T may be blurred. With the above described as well, it is possible to inform a user that the special privilege of "free shipping" is not applied.

In the following, a structure for implementing the above described function will be described. Initially, data stored in the database 15 will be described. FIGS. 6 to 11 show examples of data stored in the database 15. Note that data to be described below may be separately stored among a plurality of storage devices (databases).

FIG. 6 shows one example of a user table. The user table shows a list of users who use the virtual shopping mall. The user table shown in FIG. 6 includes "user ID", "user name", "delivery destination", and "mail address" fields. The "user ID" field indicates identification information for uniquely identifying a user. The "user name" and "mail address" fields indicate the name and mail address of the user. The "delivery destination" field indicates a delivery destination of an item. For example, the address of the user is registered in the "delivery destination" field.

FIG. 7 shows one example of a store table. The store table shows a list of stores that open in the virtual shopping mall. The store stable shown in FIG. 7 includes "store ID", "store name", "location", and "mail address" fields. The "store ID" field indicates identification information for uniquely identifying a store. The "store name", "location", and "mail address" fields indicate the name, location, and mail address of the store.

FIG. 8 shows one example of an item table. The item table shows a list of items that are sold in the virtual shopping mall. The item table shown in FIG. 8 includes "item ID", "store", "item name", "category", "price", "item page data", "item image ID", "item image", and "translated page data" fields. The "item ID" field indicates identification information for uniquely identifying an item. The "store" field indicates a store (store ID) that sells the item. The "item name", "category", and "price" fields indicate the name, category, and price of the item, respectively.

The "item page data" field indicates link information (for example, URL) to item page data. The "item image ID" field indicates identification information for uniquely identifying an item image. The "item image" field indicates link information (for example, URL) to the item image. The "translated page data" field indicates link information (for example, URL) to translated page data obtained by translating item page data. Note that the item page data, translated page data, and item image data are stored in the database 15.

FIG. 9 shows one example of a recognized character string table. The recognized character string table shows a list of character strings recognized (detected) based on an item image. The recognized character string table shown in FIG. 9 includes "item image ID", "recognized character string", "position", "translated character string", and "related special privilege" fields. The "item image ID" field indicates identification information for uniquely identifying an item image. The "recognized character string" field indicates a character string recognized (detected) based on the item image. The "position" field indicates the position of the recognized character string in the item image. The "translated character string" field indicates translation of the recognized character string. The "related special privilege" field indicates a special privilege related to the recognized character string.

FIG. 10 shows one example of a special privilege table. The special privilege table shows one example of a special privilege to be offered in the virtual shopping mall. The special privilege table shown in FIG. 10 includes "special privilege ID", "content", and "character string example" fields. The "special privilege ID" field indicates identification information for uniquely identifying a special privilege. The "content" field indicates the content of the special privilege. In the "character string example" field, an example of a character string indicating the special privilege is registered. For example, a character string that can be added to the item image 34 as a character string indicating a special privilege is registered in the "character string example" field.

FIG. 11 shows one example of an application condition table. The application condition table shows a condition for determining whether or not a user can receive a special privilege. The application condition table shown in FIG. 11 includes "special privilege ID" and "application condition" fields. The "special privilege ID" field indicates identification information for uniquely identifying a special privilege. The "application condition" field indicates a condition for determining whether or not a user can receive the special privilege.

For example, in a case where the result of determination as to whether or not a user can receive a special privilege will vary depending on the delivery destination of an item (the address of the user), a condition related to the delivery destination of an item (the address of the user) is registered in the "application condition" field.

Also, when a period (campaign period) during which special privilege is applied is set, a condition related to a period is registered in the "application condition" field. In the example shown in FIG. 11, for example, a special privilege with the special privilege ID "A001" is always applied to a user who has set a location other than a specific region in Japan as a delivery destination. Also, a special privilege with the special privilege ID "A001" is applied to a user who has set a location outside Japan as a delivery destination during the period from February 1 to 28, 2014.

Note that a condition other than the above described condition may be registered in the "application condition" field. For example, in a case where a special privilege is applied to only a user who buys a specific item, a condition related to an item is registered in the "application condition" field. For example, in a case where a special privilege is applied to only a user who buys an item belonging to a specific category, a condition related to a category is registered in the "application condition" field. Also, in a case where a special privilege is applied to only a user who buys an item belonging to a specific price range, a condition related to a price is registered in the "application condition" field.

Other than the above described data, data for translation etc., for example, is stored in the database 15.

Figure 12:
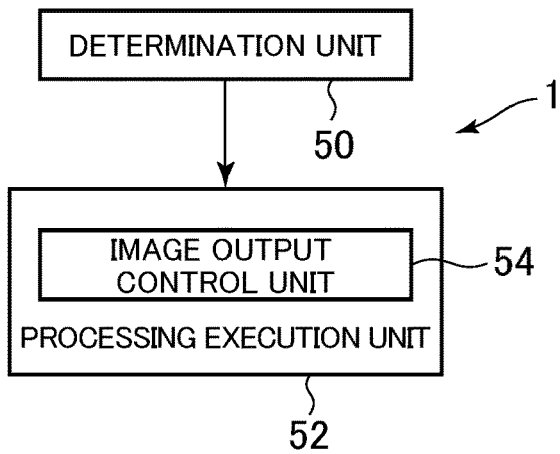
FIG. 12 is a function block diagram showing one example of functions implemented in an electronic commerce system according to the first embodiment.

In the following, function blocks implemented in the electronic commerce system 1 will be described. FIG. 12 is a function block diagram showing function blocks implemented in the electronic commerce system 1. As shown in FIG. 12, the electronic commerce system 1 includes a determination unit 50 (determination means) and a processing execution unit 52 (processing execution means).

For example, the above described function blocks are implemented by the server 10 or the user terminal 20. For example, the above described function blocks are implemented in the server 10. That is, the control unit 11 of the server 10 executes processing according to a program, thereby functioning as the above described function blocks.

The determination unit 50 determines, based on a character string contained in an image and a determination condition stored in the storage unit, whether or not it is appropriate to have a viewer to view the image according to a setting (an aspect) in which the information indicated by the character string is not changed or deleted. That is, the determination unit 50 determines whether or not it is appropriate to show the information indicated by the character string contained in the image as it is to a viewer.

The "determination condition" refers to a condition for determining whether or not it is appropriate to have a viewer to view an image according to a setting in which the information indicated by a character string contained in the image is not changed or deleted. For example, this determination condition is set based on a character string contained in an image. As will be described later, for example, an application condition registered in the application condition table (FIG. 11) corresponds to one example of the "determination condition".

For example, the determination unit 50 may determine whether or not the information indicated by a character string contained in an image is applicable to a viewer, to thereby determine whether or not it is appropriate to have the viewer to view the image according to a setting in which the information is not changed or deleted.

For example, in a case where the information indicated by a character string contained in an image is related to a matter advantageous to a viewer, the determination unit 50 determines whether or not such an advantageous matter will be offered to the viewer. Also, for example, in a case where the information indicated by a character string contained in an image is related to a matter disadvantageous to a viewer, the determination unit 50 determines whether or not such a disadvantageous matter will be imposed on the viewer.

For example, in a case where the character string 40 related to a special privilege to be offered to a user buying an item is contained in the item image 34, the determination unit 50 determines whether or not the special privilege is applicable to a viewer to thereby determine whether or not it is appropriate to have the viewer to view the item image 34 according to a setting in which the information indicated by the character string 40, namely, "special privilege is applied", is not changed or deleted.

A "special privilege" refers to a favor or treatment, etc., to be offered to a user and is advantageous to the user. Examples of "special privileges" are listed below: [a] the shipping fee of an item becomes cheaper than a normal fee; [b] the shipping fee of an item becomes free; [c] a point is given to a user; and [d] more points than usual are given to a user.

Note that a "point" can be used as a virtual currency in the virtual shopping mall, and that a user can use the point to pay the entirety or a part of payment when buying an item.

For example, the determination unit 50 determines whether or not an application condition set to a special privilege (see FIG. 11) is satisfied to thereby determine whether or not the special privilege is applicable to the user.

For example, as shown in FIG. 11, in a case where a condition related to a user is included in the application condition, the determination unit 50 determines whether or not information related to a user satisfies the application condition. In the example shown in FIG. 11, a condition related to place information in connection with a user is included in the application condition. For example, a condition related to a delivery destination of an item set by a user (the address of a user) is included in the application condition. Therefore, the determination unit 50 determines whether or not the place information related to the user (the delivery destination of an item) satisfies the application condition.

Also, for example, as shown in FIG. 11, in a case where a condition related to a date and time is included in the application condition, the determination unit 50 determines whether or not the current date and time (that is, the date and time at which a user views the item image 34) satisfies the application condition. In the example shown in FIG. 11, a period is set as an application condition. Therefore, the determination unit 50 determines whether or not the current date and time is included in the period.

Note that in a case where a condition related to information associated with the item image 34 is included in the application condition, the determination unit 50 determines whether or not the information associated with the item image 34 satisfies the application condition. For example, in a case where a condition related to an attribute (for example, category or price) of an item is set as an application condition, the determination unit 50 determines whether or not the attribute (for example, category or price) of an item corresponding to the item image 34 satisfies the application condition.

When the application condition is satisfied, the determination unit 50 determines that the special privilege is applicable to the user viewing the item image 34. In this case, the determination unit 50 determines that it is appropriate to have the viewer to view the item image 34 according to a setting in which the information indicated by the character string 40 contained in the item image 34 is not changed or deleted. That is, the determination unit 50 determines that it is appropriate to show the information indicated by the character string 40 contained in the item image 34 as it is to the viewer.

Meanwhile, when the application condition is not satisfied, the determination unit 50 determines that the special privilege is not applicable to the user viewing the item image 34. In this case, the determination unit 50 determines that it is not appropriate to have the viewer to view the item image 34 according to a setting in which the information indicated by the character string 40 contained in the item image 34 is not changed or deleted. That is, the determination unit 50 determines that it is not appropriate to show the information indicated by the character string 40 contained in the item image 34 as it is to the viewer.

When the determination unit 50 determines that it is not appropriate to have the viewer to view the image according to a setting in which the information indicated by the character string contained in the image is not changed or deleted, the processing execution unit 52 executes processing necessary to have the viewer to view the image according to a setting in which the information indicated by the character string is changed or deleted.

"Processing necessary to have a viewer to view an image according to a setting in which the information indicated by a character string is changed or deleted" refers to, for example, control processing for outputting an image to the display unit 25 of the user terminal 20 according to a setting in which the information indicated by a character string is changed or deleted.

As shown in FIG. 12, the processing execution unit 52 includes an image output control unit 54 (image processing control means). When the determination unit 50 determines that it is not appropriate to have a viewer to view an image according to a setting in which the information indicated by a character string contained in the image is not changed or deleted, the image output control unit 54 executes control to output the image to the display unit 25 of the user terminal 20 according to a setting in which the information indicated by the character string is changed or deleted. That is, the image output control unit 54 executes control to output the image to the display unit 25 of the user terminal 20 so as not to show the information indicated by the character string as it is.

For example, when it is determined that the special privilege indicated by the character string 40 contained in the item image 34 is not applicable to a user, the image output control unit 54 executes control to output an image or a character string for changing the information indicated by the character string 40 so as to be associated with at least one of the item image 34 and the character string 40. For example, the image output control unit 54 executes control to output an image or a character string indicating that the information indicated by the character string 40 is not valid so as to be associated with at least one of the item image 34 and the character string 40 (see FIG. 4, for example).

Note here that to output an image so as to be associated with the item image 34" refers to, for example, to output an image in a manner such that a user can recognize at a glance that the image is associated with the item image 34. For example, to output an image such that at least a part thereof overlaps the item image 34 corresponds to one example of to output an image so as to be associated with the item image 34". Also, for example, to output an image to the vicinity (around) of the item image 34 corresponds to one example of to output an image so as to be associated with the item image 34". For example, to output an image to a position set based on the display position of the item image 34 corresponds to one example of to output an image so as to be associated with the item image 34".

Similarly, to output an image so as to be associated with the character string 40" refers to, for example, to output an image in a manner such that a user can recognize at a glance that the image is associated with the character string 40, and a specific example of this is similar to that in the case of outputting an image so as to be associated with the item image 34.

Also, to output a character string so as to be associated with the item image 34" refers to, for example, to output a character string in a manner such that a user can recognize at a glance that the character string is associated with the item image 34, and a specific example thereof is similar to that in the case of outputting an image so as to be associated with the item image 34.

Similarly, to output a character sting so as to be associated with the character string 40" refers to, for example, to output a character string in a manner such that a user can recognize at a glance that the character string is associated with the character string 40, and a specific example thereof is similar to that in the case of outputting a character string so as to be associated with the item image 34.

For example, the image output control unit 54 executes control to display the inapplicable mark 42 such as is shown in FIG. 4 so as to be associated with the character string 40 (the item image 34). The inapplicable mark 42 indicates that the special privilege indicated by the character string 40 is not applied, and in this case, the inapplicable mark 42 corresponds to one example of an image for changing the information indicated by the character string 40".

Note that, as described above, a message in Japanese to the effect that the special privilege of "free shipping" is not applied may be displayed on the item screen 30 shown in FIG. 4. That is, the image output control unit 54 may execute control to display the above mentioned message so as to be associated with the character string 40 (the item image 34).

For example, the image output control unit 54 may execute control to display a balloon that contains the above mentioned message so as to be associated with the character string 40 (the item image 34). For example, the image output control unit 54 may execute control to display a balloon such that at least a part thereof overlaps the character string 40 (the item image 34). For example, the image output control unit 54 may execute control to display a balloon such that the tail thereof overlaps the character string 40 (the item image 34).

Note that the balloon may not be displayed on the character string 40 (the item image 34). In this case, for example, the image output control unit 54 may display the balloon such that the tail thereof is directed from the main part thereof to the character string 40 (the item image 34).

Also, when it is determined that the special privilege indicated by the character string 40 contained in the item image 34 is not applicable to a user, the image output control unit 54 may execute control to restrict output of the character string 40 to the display unit 25 of the user terminal 20.

For example, the image output control unit 54 may not display the entirety or a part of the character string 40 on the display unit 25 of the user terminal 20. For example, the image output control unit 54 may display the item image 34 with the character string 40 entirely or partially deleted on the display unit 25 of the user terminal 20. For example, the image output control unit 54 may display the item image 34 with the character string 40 entirely or partially filled with the background color of the item image 34 on the display unit 25 of the user terminal 20. Also, for example, the image output control unit 54 may display the item image 34 with the character string 40 entirely or partially blurred on the display unit 25 of the user terminal 20.

Note that an item image with a character string related to a special privilege entirely or partially deleted, an item image with the above mentioned character string entirely or partially filled with a background color, or an item image with the above mentioned character string entirely or partially blurred may be generated when the item image is registered and registered so as to be associated with its original item image.

Also, for example, the image output control unit 54 executes control to output the translated character string 40T obtained by translating the character string 40 contained in the item image 34 into another language together with the character string 40 to the display unit 25 of the user terminal 20 (see FIG. 3). Note that the image output control unit 54 may output the translated character string 40l, instead of the character string 40, to the display unit 25 of the user terminal 20. That is, the image output control unit 54 may replace the character string 40 by the translated character string 40T.

Then, when it is determined that the special privilege indicated by the character string 40 contained in the item image 34 is not applicable to a user, the image output control unit 54 executes control to output an image or a character string for changing the information indicated by the character string 40 so as to be associated with at least one of the item image 34, the character string 40, and the translated character string 40T. For example, the image output control unit 54 executes control to output an image or a character string that indicates that the information indicated by the character string 40 is not valid so as to be associated with at least one of the item image 34, the character string 40, and the translated character string 40T (see FIG. 5, for example).

Note that to output an image (or a character string) so as to be associated with the image 34" and to output an image (or a character string) so as to be associated with the character string 40" refer to as described above. Further, to output an image (or a character string) so as to be associated with the translated character string 40T" refers to, for example, to output an image (or a character string) in a manner such that a user can recognize at a glance that the image (or the character string) is associated with the translated character string 40T, and a specific example thereof is similar to that in the case of outputting an image (or a character string) so as to be associated with the character string 40.

For example, the image output control unit 54 executes control to display the inapplicable mark 42 such as is shown in FIG. 5 so as to be associated with the translated character string 40T (the item image 34). As described above, the inapplicable mark 42 indicates that the special privilege indicated by the character string 40 is not applicable, and corresponds to one example of an image for changing the information indicated by the character string 40" in this case.

Note that as described above, a message in English to the effect that the special privilege of "free shipping" is not applicable may be displayed on the item screen 30 shown in FIG. 5. That is, the image output control unit 54 may execute control to display the above mentioned message so as to be associated with the translated character string 40T (the item image 34).

Also, when it is determined that the special privilege indicated by the character string 40 contained in the item image 34 is not applicable to a user, the image output control unit 54 may restrict output of the translated character string 40T to the display unit 25 of the user terminal 20.

For example, the image output control unit 54 may not display the entirety or a part of the translated character string 40T on the display unit 25 of the user terminal 20. Also, for example, the image output control unit 54 may display the translated character string 40T with the translated character string 40T entirety or partially blurred on the display unit 25 of the user terminal 20.

Note that when it is determined that the special privilege indicated by the character string 40 contained in the item image 34 is applicable to a user viewing the item image 34, the image output control unit 54 may execute control to output a character string or an image indicating that the special privilege indicated by the character string 40 is applied to the user so as to be associated with the translated character string 40T (the item image 34, the character string 40).

Figure 13:
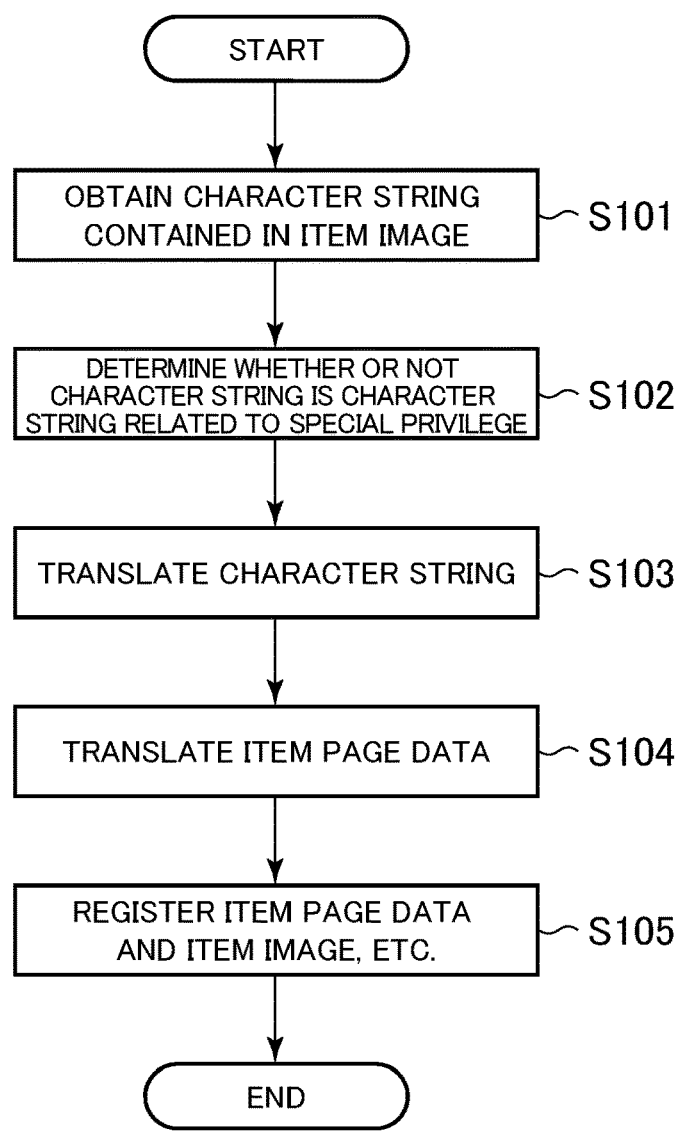
FIG. 13 shows one example of processing executed in an electronic commerce system according to the first embodiment.

In the following, processing executed in the electronic commerce system 1 will be described. FIG. 13 is a flowchart showing one example of processing executed in the electronic commerce system 1. For example, when data concerning an item (including item page data and item image data) is newly registered, the processing shown in FIG. 13 is executed. That is, when the store terminal 4 requests the server 10 to register data on an item, the control unit 11 of the server 10 executes the processing shown in FIG. 13. Note that processing similar to the processing shown in FIG. 13 is executed also in updating the data on an item.

As shown in FIG. 13, initially, the control unit 11 obtains a character string contained in an item image (S101). For example, the control unit 11 executes publicly known character recognition processing with respect to an item image to thereby recognize a character string contained in the item image. Note that the control unit 11 may send an item image to another server for executing character recognition processing to thereby request the other server to execute character recognition processing with respect to the item image. Then, the control unit 11 may obtain the result of recognition from the other server. Note that in a case where a character string contained in an item image is not obtained, step S104 is executed without executing steps S102 and S103.

After execution of step S101, the control unit 11 determines whether or not the character string obtained at step S101 is a character string related to special privilege (S102). For example, with reference to the special privilege table (FIG. 10), the control unit 11 determines whether or not the character string obtained at step S101 corresponds to any of the examples of character strings related to special privilege. For example, in a case where the character string obtained at step S101 corresponds to any of the examples of a character string related to special privilege, the control unit 11 determines that the character string obtained at step S101 is a character string related to special privilege. In this case, the control unit 11 obtains the special privilege ID of the special privilege.

After execution of step S102, the control unit 11 translates the character string obtained at step S101 (S103). For example, the control unit 11 executes publicly known translation processing to thereby obtain a translated character string. Note that the control unit 11 may send the character string obtained at step S101 to another server for executing translation processing to thereby request the other server to translate the character string. Then, the control unit 11 may obtain the result of translation from the other server.

After execution of step S103, the control unit 11 translates item page data (S104). For example, the control unit 11 executes publicly known machine translation processing with respect to item page data prepared by a store to thereby obtain translated item page data. That is, the control unit 11 obtains translated item page data including the translated description 36T obtained by applying machine translation to the description 36. Note that the control unit 11 may send item page data to another server for executing machine translation processing to thereby request the other server to execute machine translation with respect to the item page data. Then, the control unit 11 may obtain the result of machine translation from the other server.

After execution of step S104, the control unit 11 registers the item page data and the item image data, etc. (S105). For example, the control unit 11 stores the item page data, the item image data, and the translated page data, etc. in the database 15. Also, the control unit 11 executes registration in the item table (FIG. 8) and the recognized character string table (FIG. 9). That is, the control unit 11 registers information on an item in the item table, and also the result of processing at steps S101 to S103 in the recognized character string table.

Figure 14:
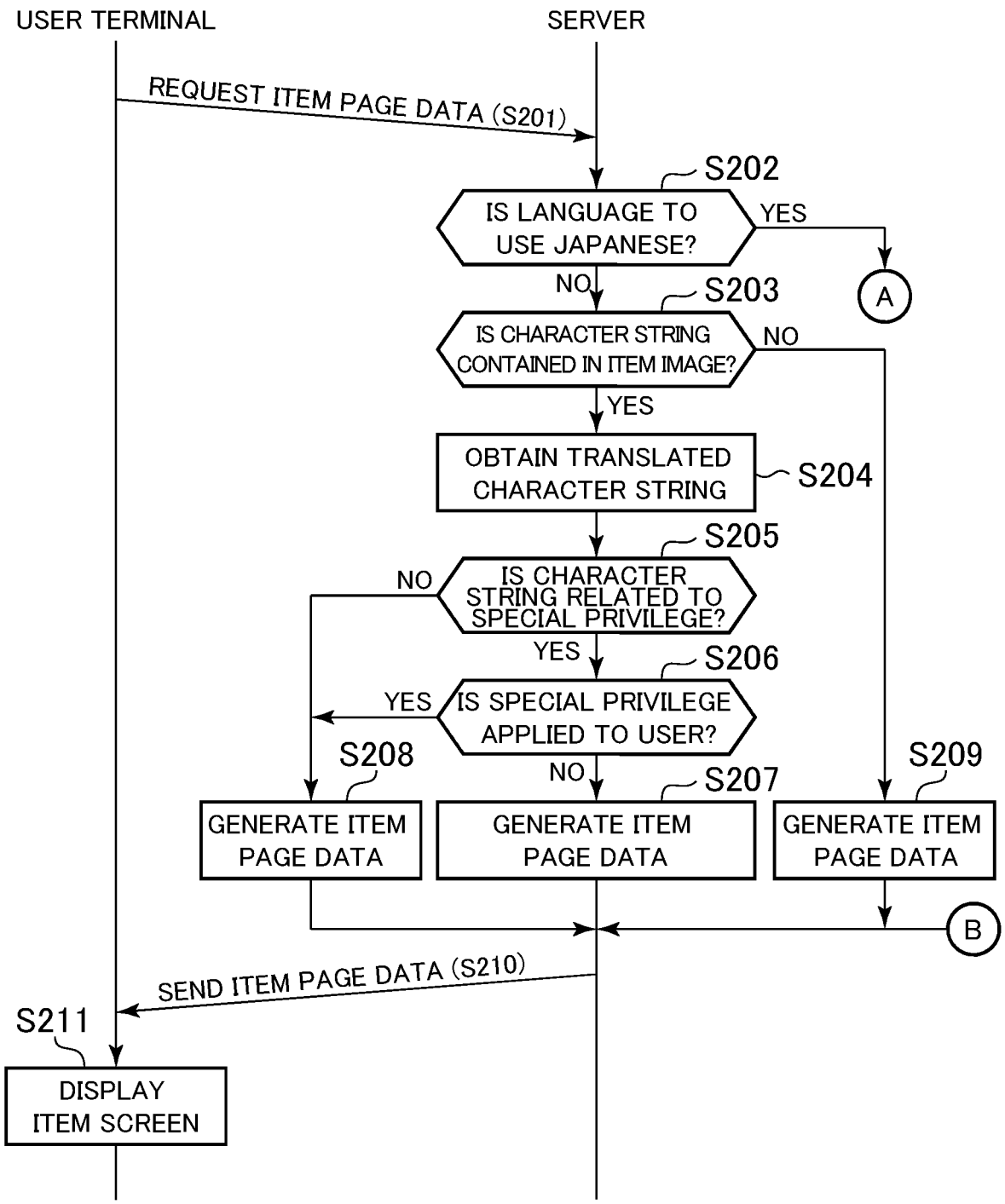
FIG. 14 shows another example of processing executed in an electronic commerce system according to the first embodiment.
Figure 15:
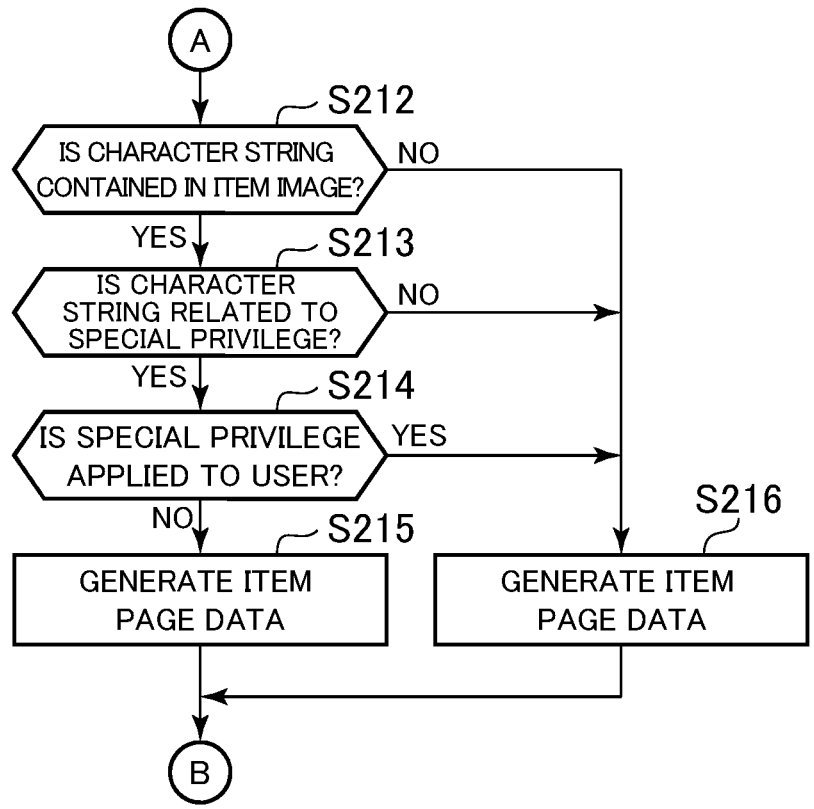
FIG. 15 shows another example of processing executed in an electronic commerce system according to the first embodiment.

FIGS. 14 and 15 are a flowchart showing one example of another processing executed in the electronic commerce system 1. FIGS. 14 and 15 show one example of processing executed when a user has selected its desired item. That is, one example of processing for displaying the item screen 30 of an item selected by a user on the display unit 25 of the user terminal 20 is shown.

When a user selects its desired item, the control unit 21 of the user terminal 20 requests item page data, as shown in FIG. 14 (S201). In this case, the control unit 21 notifies the server 10 of the user ID of the user, the item ID of the item selected by the user, and the language to use selected by the user. Note that for brevity of description, the item selected by the user will be hereinafter referred to as "an item X" and an item image of the item X as an "item image X".

When the above described request is received by the server 10, the control unit 11 of the server 10 determines whether or not the language to use selected by the user is Japanese (the default language of the electronic commerce system 1) (S202).

When the language to use selected by the user is not Japanese, that is, when the language to use selected by the user is English, the control unit 11 determines whether or not any character string is contained in the item image X (S203). For example, the control unit 11 refers to the recognized character string table (FIG. 9) to determine whether or not a recognized character string is registered so as to be associated with the item image ID of the item image X. In a case where a recognized character string is registered so as to be associated with the item image ID of the item image X, the control unit 11 determines that a character string is contained in the item image X.

Upon determination that a character string is contained in the item image X, the control unit 11 obtains a translated character string of the character string from the recognized character string table (S204).

Also, the control unit 11 determines whether or not the character string contained in the item image X is a character string related to special privilege (S205). For example, the control unit 11 refers to the recognized character string table (FIG. 9) to determine whether or not any special privilege ID is registered so as to be associated with the item image ID of the item image X. In a case where a special privilege ID is registered so as to be associated with the item image ID of the item image X, the control unit 11 determines that the character string contained in the item image X is a character string related to special privilege. Note that, in this case, the control unit 11 obtains the special privilege ID registered so as to be associated with the item image ID of the item image X.

When it is determined that the character string contained in the item image X is a character string related to special privilege, the control unit 11 determines whether or not the user can receive the special privilege (S206).

For example, the control unit 11 refers to the application condition table (FIG. 11) to obtain an application condition for the special privilege. Then, the control unit 11 determines whether or not the application condition is satisfied. For example, in a case where a condition related to the delivery destination of an item set in advance by a user (the address of the user) is included in the application condition of special privilege, the control unit 11 obtains the delivery destination of the item set in advance by the user from the user table, and determines whether or not the delivery destination satisfies the above described condition. Also, for example, in a case where a condition related to a date and time is included in the application condition of special privilege, the control unit 11 determines whether or not the current date and time satisfies the above described condition.

When it is determined that the user cannot receive the special privilege, the control unit 11 generates item page data for the item X (S207). In this case, item page data for displaying the item screen 30 such as is shown in FIG. 5, for example, is generated. That is, item page data for displaying the item screen 30 in English on which the translated character string 40T and the inapplicable mark 42 are displayed when the cursor 32 is positioned on the item image 34 is generated. Note that it is set such that the translated character string 40T is displayed so as to be associated with the character string 40 contained in the item image 34, and the inapplicable mark 42 is displayed so as to be associated with the translated character string 40T.

Meanwhile, when it is determined that the user can receive the special privilege, the control unit 11 generates item page data for the item X (S208). In this case, item page data for displaying the item screen 30 such as is shown in FIG. 3, for example, is generated. That is, item page data for displaying the item screen 30 in English on which the translated character string 40T is displayed when the cursor 32 is positioned on the item image 34 is generated. Note that it is set such that the translated character string 40T is displayed so as to be associated with the character string 40 contained in the item image 34.

Also when it is determined at step S205 that the character string contained in the item image X is not a character string related to special privilege, step S208 is executed.

When it is determined at step S203 that a character string is not contained in the item image X, the control unit 11 generates item page data for the item X (S209). In this case, item page data for displaying the item screen 30 in English is generated. Note that translated character string 40T and the inapplicable mark 42 are not set in the item page data in this case.

When it is determined at step S202 that the language to use selected by the user is Japanese, the control unit 11 determines whether or not any character string is contained in the item image X, as shown in FIG. 15 (S212). When it is determined that a character string is contained in the item image X, the control unit 11 determines whether or not the character string contained in the item image X is a character string related to special privilege (S213). When it is determined that the character string contained in the item image X is a character string related to special privilege, the control unit 11 determines whether or not the user can receive the special privilege (S214). These steps S212, S213, S214 are similar to steps S203, S205, S206.

When it is determined that the user cannot receive the special privilege, the control unit 11 generates item page data for the item X (S215). In this case, item page data for displaying the item screen 30 such as is shown in FIG. 4, for example, is generated. That is, item page data for displaying the item screen 30 in Japanese on which the inapplicable mark 42 is displayed when the cursor 32 is positioned on the item image 34 is generated. Note that it is set such that the inapplicable mark 42 is displayed so as to be associated with the character string 40 in the item image 34.

Meanwhile, when it is determined that the user can receive the special privilege, the control unit 11 generates item page data for the item X (S216). In this case, item page data for displaying the item screen 30 such as is shown in FIG. 2, for example, is generated. That is, item page data for displaying the item screen 30 in Japanese on which the inapplicable mark 42 is not displayed is generated.

Also when it is determined at step S213 that the character string contained in the item image X is not a character string related to special privilege, step S216 is executed. Similarly, also when it is determined at step S212 that a character string is not contained in the item image X, step S216 is executed.

After execution of any of steps S207, S208, S209, S215, and S216, the control unit 11 sends the item page data for the item X to the user terminal 20, as shown in FIG. 14 (S210). In this case, the item screen 30 for the item. X is displayed on the display unit 25 at the user terminal 20, based on the item page data for the item X received from the server 10 (S211).

Note that the item page data generated at any of the steps S207, S208, S209, S215, and S216 may be generated and stored in advance in the database 15 when the item page data is registered (that is, when the processing shown in FIG. 13 is executed). Then, the item page data stored in the database 15 may be obtained from the database 15 at each of steps S207, S208, S209, S215, and S216.

In the above described electronic commerce system 1, in a case where it is determined that it is not appropriate to show the information indicated by the character string 40 contained in the item image 34 as it is to a user viewing the item image 34, that is, when it is determined that the special privilege indicated by the character string 40 contained in the item image 34 is not applicable to a user viewing the item image 34, the item image 34 is displayed on the item screen 30 according to an setting in which the information indicated by the character string 40 is changed or deleted. For example, the item image 34 (the character string 40) is displayed on the item screen 30 together with the inapplicable mark 42 such as is shown in FIG. 4. For example, if the character string 40 indicating application of special privilege is contained in the item image 34, there is a possibility that a user misunderstands that the special privilege is applied although the user actually cannot receive the special privilege. Regarding this point, according to the electronic commerce system 1, by displaying the inapplicable mark 42, it is possible to inform the user that the special privilege is not applied. In other words, it is possible to arrange such that a user is not informed of application of special privilege.

Also, in the electronic commerce system 1, when a user selects a language other than Japanese (for example, English) as a language to use, the item screen 30 is displayed in the language other than Japanese. In this case, the translated character string 40T of the character string 40 contained in the item image 34 is also displayed on the item screen 30. For example, in a case where the character string 40 indicating application of special privilege is contained in the item image 34, the translated character string 40T of the character string 40 is displayed on the item screen 30. As a result, even a user who is not familiar with Japanese (the default language of the electronic commerce system 1) can understand an advertisement statement etc. added to the item image 34 by a store.

In this case as well, when it is determined that it is not appropriate to show the information indicated by the character string 40 contained in the item image 34 as it is to a user viewing the item image 34, that is, when it is determined that the special privilege indicated by the character string 40 contained in the item image 34 is not applied to a user viewing the item image 34, the item image 34 is displayed on the item screen 30 according to an setting in which the information indicated by the character string 40 is changed or deleted. For example, the item image 34 (the translated character string 40T) is displayed on the item screen 30 together with the inapplicable mark 42 such as is shown in FIG. 5. As a result, it is possible to inform a user as well who is not familiar with Japanese (the default language of the electronic commerce system) that the special privilege is not applied.

Second Embodiment

A second embodiment of the present invention will be described. An overall structure of an electronic commerce system 1 according to the second embodiment (an information processing system) is similar to that in the first embodiment. Also, the item screen 30 such as is shown in FIG. 2 or 3, for example, is displayed also in the electronic commerce system 1 according to the second embodiment.

As described above, there is a case in which special privilege to be offered in purchase of an item is not applicable to some users. For example, the special privilege of "free shipping" may not be applied to a user who has registered a location outside Japan as a delivery destination of an item (in other words, a user living outside Japan). For example, the special privilege of "free shipping" is applied to such a user only during a predetermined campaign period but not at any time other than the campaign period.

However, the item image 34 such as is shown in FIG. 2, for example, may be prepared by a store without taking into account of the presence of such a user. For example, if the item screen 30 (the character string 40 or the translated character string 40T) such as is shown in FIG. 2 or 3 is displayed at the user terminal 20 of the above described user at any time other than the campaign period, the user may misunderstand that the shipping fee is free although the shipping fee is actually not free.

Regarding this point, in the electronic commerce system 1, in a case where the special privilege indicated by the character string 40 (or the translated character string 40T) contained in the item image 34 is not applied to a user viewing the item image 34, a store is notified.

For example, a message such as "The character string of "free shipping" is added to the item image. But "free shipping" is not applied to a user who has registered a location outside Japan as a delivery destination of an item. Would you like to change the item image?" is sent to a store. Alternatively, such a message is displayed on a screen dedicated to a store. Still alternatively, a person in charge from an operating company of the virtual shopping mall may call or actually visit a store to inform of the above described message.

In the following, a structure for implementing the above described function will be described. Initially, data stored in the database 15 will be described. Also in the electronic commerce system 1 according to the second embodiment, data such as is shown in FIGS. 6 to 11, for example, is stored in the database 15. Note that similar to the first embodiment, these data may be separately stored among a plurality of storage devices (databases).

Figure 16:
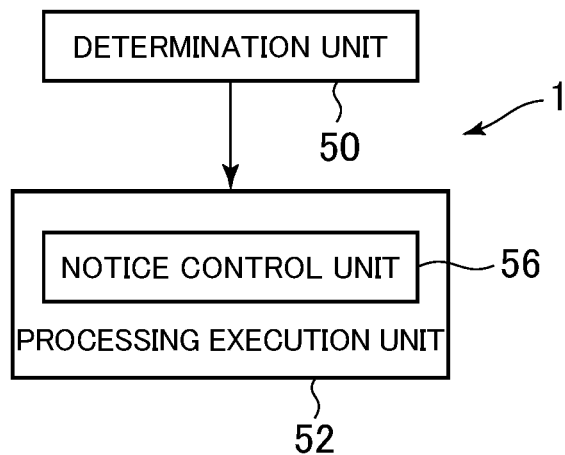
FIG. 16 is a function block diagram showing one example of functions implemented in an electronic commerce system according to the second embodiment.

Then, function blocks implemented in the electronic commerce system 1 according to the second embodiment will be described. FIG. 16 is a function block diagram showing function blocks implemented in the electronic commerce system 1 according to the second embodiment. As shown in FIG. 16, the electronic commerce system 1 according to the second embodiment includes a determination unit (determination means) and a processing execution unit 52 (processing execution means). Note that the determination unit 50 is similar to that in the first embodiment and thus not described again below.

These function blocks are implemented by the server 10 or the user terminal 20. For example, these function blocks are implemented in the server 10. That is, the control unit 11 of the server 10 executes processing according to a program to thereby function as these function blocks.

When the determination unit 50 determines that it is not appropriate to have a viewer to view an image according to a setting in which the information indicated by a character string contained in the image is not changed or deleted, the processing execution unit 52 executes processing necessary to have the viewer to view the image according to a setting in which the information indicated by the character string is changed or deleted.

"Processing necessary to have a viewer to view an image according to a setting in which the information indicated by a character string is changed or delete" refers to, for example, control processing for notifying a store of information on the result of determination by the determination unit 50.

As shown in FIG. 16, the processing execution unit 52 includes a notice control unit 56. For example, when the determination unit 50 determines that it is not appropriate to have a viewer to view an image according to an setting in which the information indicated by a character string contained in the image is not changed or deleted, the notice control unit 56 executes control to notify the provider of the image (in other words, the registrant or creator of the image: a store, for example) of information on the result of determination by the determination unit 50.

For example, when it is determined that the special privilege indicated by the character string 40 contained in the item image 34 is not applicable to a user viewing the item image 34, the notice control unit 56 executes control to notify the store of a message to that effect.

For example, the notice control unit 56 sends the above mentioned message to a store by means of an electronic mail. Also, for example, the notice control unit 56 controls to output the above mentioned message to a screen dedicated to the store.

Also, for example, the notice control unit 56 stores data indicating that the above described message should be informed to a store in the database 15. For example, in a case where data on a list of stores to which the above mentioned message should be informed is stored in the database 15, the notice control unit 56 adds the store to the list data. Also, in a case, for example, in which flag data indicating whether or not the above mentioned message should be informed is stored for every store in the database 15, the notice control unit 56 sets flag data of the store.

Note that in a case where the above described data is stored in the database 15, a person in charge from an operating company of the virtual shopping mall calls or actually visits a store to inform (or informs by means of electronic mail, etc.) of the message, based on the data.

Figure 17:
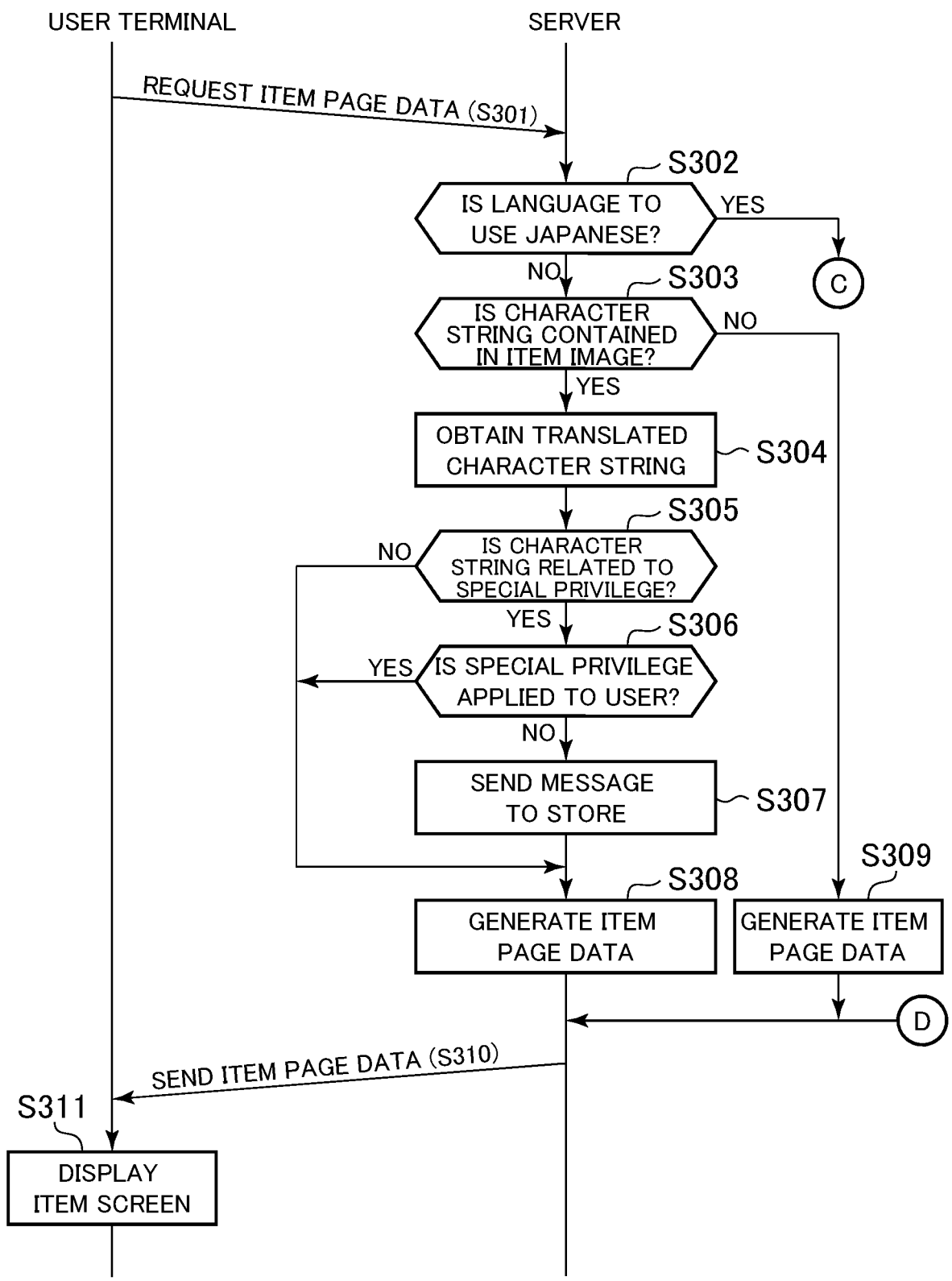
FIG. 17 shows one example of processing executed in an electronic commerce system according to the second embodiment.
Figure 18:
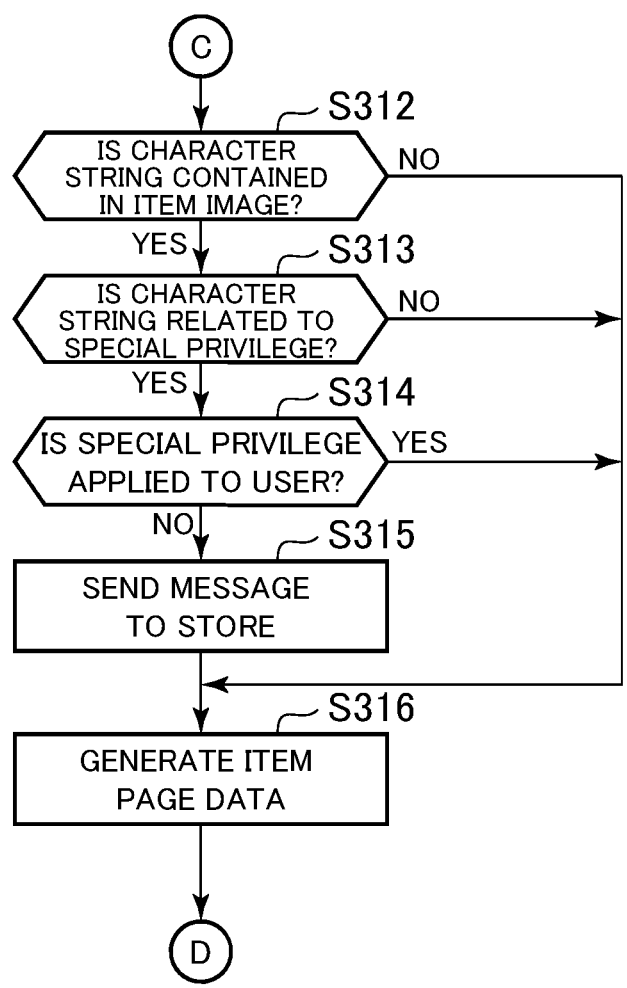
FIG. 18 shows one example of processing executed in an electronic commerce system according to the second embodiment.

In the following, processing executed in the electronic commerce system 1 according to the second embodiment will be described. FIGS. 17 and 18 show one example of processing executed upon selection by a user of its desired item, that is, one example of processing for displaying the item screen 30 of an item selected by a user on the display unit 25 of the user terminal 20.

Steps S301 to S306 shown in FIG. 17 are similar to steps S201 to S206 shown in FIG. 14.

When it is determined at step S306 that a user cannot receive the special privilege, the control unit 11 sends a message (for example, an electronic mail) to the store that sells the item X (S307). For example, the control unit 11 sends to the store a message such as "The character string of "free shipping" is added to the item image. But "free shipping" is not applied to a user who has registered a location outside Japan as a delivery destination of an item. Would you like to change the image?"

After execution of step S307, the control unit 11 generates an item page of the item X (S308). In this case, item page data for displaying the item screen 30 such as is shown in FIG. 3, for example, is generated. That is, item page data for displaying the item screen 30 in English on which the translated character string 40T is displayed when the cursor 32 is positioned on the item image 34 is generated. Note that the translated character string 40T is set so as to be displayed so as to be associated with the character string 40 in the item image 34.

Also when it is determined at step S306 that the user can receive the special privilege, step S308 is executed. Also when it is determined at step S305 that the character string contained in the item image X is not a character string related to special privilege, step S308 is executed.

When it is determined at step S303 that a character string is not contained in the item image X, the control unit 11 generates item page data for the item X (S309). In this case, item page data for displaying the item screen 30 in English is generated. Note that translated character string 40T is not set in the item page data in this case.

When it is determined at step S302 that the language to use selected by the user is Japanese, the control unit 11 executes steps S312 to S314 shown in FIG. 18. These steps S312, S313, S314 are similar to steps S212, S213, and S214 in FIG. 15.

When it is determined at step S314 that the user cannot receive the special privilege, the control unit 11 sends a message (for example, an electronic mail) to the store that sells the item X (S315). This step S315 is similar to step S307.

After execution of step S315, the control unit 11 generates an item page of the item X (S316). In this case, item page data for displaying the item screen 30 in Japanese is generated. Note that also in cases where it is determined at S314 that the user can receive the special privilege, where it is determined at step S313 that the character string is not a character string related to special privilege, and where it is determined at step S312 that a character string is not contained in the item image X, step S316 is executed.

After execution of step S308, S309, or S316, the control unit 11 sends the item page data on the item X to the user terminal 20 (S310). In this case, at the user terminal 20, the item screen 30 for the item X is displayed on the display unit 25, based on the item page data for the item X received from the server 10 (S311).

According to the electronic commerce system 1 according to the second embodiment described above, when it is determined that it is not appropriate to show the information indicated by the character string 40 contained in the item image 34 as it is to a user viewing the item image 34, that is, when it is determined that the special privilege indicated by the character string 40 contained in the item image 34 (or the translated character string 40T) is not applied to a user viewing the item image 34, that effect is notified to a store. According to the electronic commerce system 1 according to the second embodiment, it is possible to encourage the store to change the above described item image 34.

Note that the notice control unit 56 may store the accumulated number of times at which the determination unit 50 has determined it not appropriate to have a viewer to view an image according to a setting in which the information indicated by a character string contained in the image is not changed or deleted, in the database 15, and execute control to notify the store of a message to that effect when the accumulated number of times reaches a predetermined number of times (for example, five times).

In this case, the notice control unit 56 may execute control to notify a store of a message such as "The character string of "free shipping" is added to the item image. But "free shipping" is not applied to a user who has registered a location outside Japan as a delivery destination of an item. Five users each having registered a location outside Japan as a delivery destination of an item have ever viewed this item. Would you like to change the item image?"

Note that the present invention is not limited to the above described first and second embodiments.

[1] For example, the first embodiment may be combined with the second embodiment.

[2] For example, although a case in which the character string 40 related to special privilege to be offered to a user buying an item is contained in the item image 34 has been described in the above, the present invention can be applied also to a case where the character string 40 related to a burden to be imposed on a user buying an item is contained in the item image 34.

For example, it is possible to apply the present invention even to a case in which the character string 40 "shipping fee 300 yen" is contained in the item image 34. For example, as a user is not asked to bear "shipping fee 300 yen" during a campaign period with free shipping fee, the inapplicable mark 42 may be displayed so as to be associated with the character string 40 (or the translated character string 40T).

[3] For example, in the electronic commerce system 1, data, such as electronic book data, music data, or video data, etc., as well as an object such as drinks, etc., may be sold as an item.

[4] For example, in the electronic commerce system 1, a service as well as an item may be sold. That is, in the electronic commerce system 1, a coupon for receiving a service may be sold or service reservation may be received.

[5] Also, the present invention can be used, for example, in a case where an item image prepared for selling an item in a specific country is used on a page of an overseas shopping site prepared for the purpose of selling the item in a country other than the specific country. In this case, when it is detected at the time of registration of an item image that a character string, such as "free shipping" etc. is contained in the item image, it is determined that it is not appropriate to have a user (that is a user in the country other than the specific country) to view the item image as it is, and an item image subjected to change or deletion of the information indicated by the character string is registered. Then, the resultant item image is used in a page of the overseas shipping site.

The invention claimed is:

1. An information processing system, comprising:
   a processor; and
   a memory device that stores a plurality of instructions, which when executed by the processor, cause the processor to operate to:
   receive a request for page data;
   recognize a character string contained in an image corresponding to the page data;
   determine, based on the character string contained in the image and place information in connection with the user or a current date and time, whether or not information indicated by the character string is to be changed or deleted; and
   send page data to display the image in which the information indicated by the character string is changed or deleted in a case where it is determined that the information indicated by the character string is to be changed or deleted.

2. The information processing system according to claim 1, wherein
   the image is an image relevant to an item or a service, and
   in a case where a character string related to a special privilege to be offered to a user who receives provision of the item or the service or a burden to be imposed on the user is contained in the image, the plurality of instructions cause the processor to operate to determine whether or not the special privilege or the burden is applicable to the user, to thereby determine whether or not the information indicated by the character string is to be changed or deleted.

3. The information processing system according to claim 1, wherein the plurality of instructions cause the processor to operate to determine, based on information associated with the image, whether or not it is appropriate to have the user to view the image according to the setting in which the information indicated by the character string is not changed or deleted.

4. The information processing system according to claim 1, wherein
the plurality of instructions cause the processor to operate to generate the page data for outputting the image to the display in which the information indicated by the character string is changed or deleted, in the case where it is determined that the information indicated by the character string is to be changed or deleted.

5. The information processing system according to claim 4, wherein
the plurality of instructions cause the processor to operate to:
generate the page data for outputting to the display a translated character string obtained by translating the character string into another language together with or instead of the character string, and
execute control to output a character string or an image for changing the information indicated by the character string so as to be associated with at least one of the image, the character string, and the translated character string, in the case where it is determined that the information indicated by the character string is to be changed or deleted.

6. The information processing system according to claim 4, wherein
the plurality of instructions cause the processor to operate to:
generate the page data for outputting to the display a translated character string obtained by translating the character string into another language together with or instead of the character string, and
execute control to restrict output of the translated character string to the display in the case where it is determined that the information indicated by the character string is to be changed or deleted.

7. The information processing system according to claim 4, wherein
the plurality of instructions cause the processor to operate to generate the page data for outputting a character string or an image for changing the information indicated by the character string so as to be associated with at least one of the image and the character string in the case where it is determined that the information indicated by the character string is to be changed or deleted.

8. The information processing system according to claim 4, wherein
the plurality of instructions cause the processor to operate to execute control to restrict output of the character string to the display in the case where it is determined that the information indicated by the character string is to be changed or deleted.

9. The information processing system according to claim 1, wherein
notify a provider of the image of information on a result of determination as to whether or not the information is to be changed or deleted.

10. A method for controlling an information processing system, comprising:
receiving a request for page data;
recognizing a character string contained in an image corresponding to the page data;
determining, based on the character string contained in the image and place information in connection with the user or a current date and time, whether or not information indicated by the character string is to be changed or deleted; and
sending page data to display the image in which the information indicated by the character string is changed or deleted in a case where it is determined that the information indicated by the character string is to be changed or deleted.

11. A non-transitory computer readable information storage medium storing a program for causing a computer to:
receive a request for page data;
recognize a character string contained in an image corresponding to the page data;
determine, based on the character string contained in the image and place information in connection with the user or a current date and time, whether or not information indicated by the character string is to be changed or deleted; and
send page data to display the image in which the information indicated by the character string is changed or deleted in a case where it is determined that the information indicated by the character string is to be changed or deleted.

* * * * *